Figure 1:
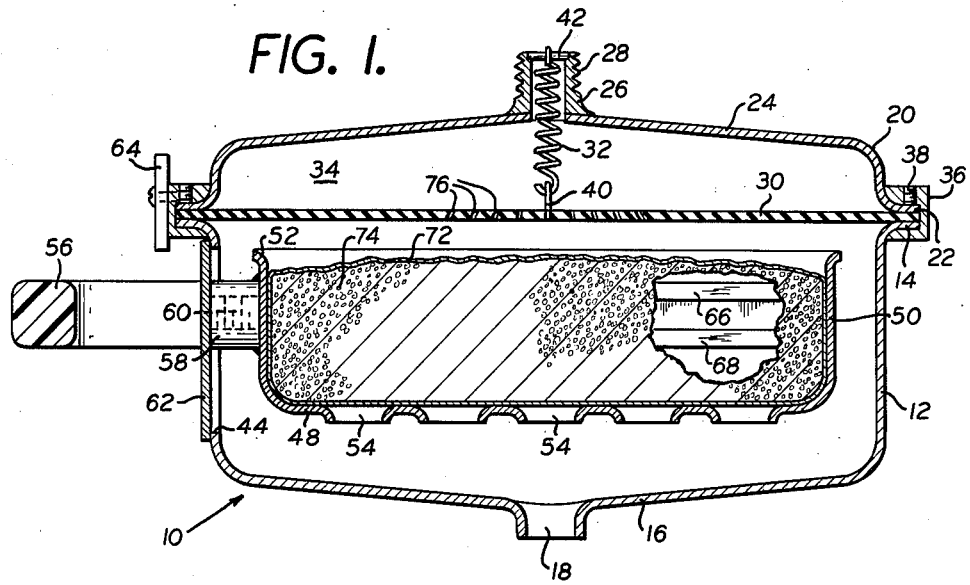

April 24, 1962     A. J. FIORI     3,030,874
METHOD OF MAKING BEVERAGES AND A CANISTER APPARATUS THEREFOR
Filed Aug. 7, 1959     2 Sheets-Sheet 1

INVENTOR
ANTHONY J. FIORI
BY
*Jerome Bauer*
ATTORNEY.

April 24, 1962  A. J. FIORI  3,030,874
METHOD OF MAKING BEVERAGES AND A CANISTER APPARATUS THEREFOR
Filed Aug. 7, 1959  2 Sheets-Sheet 2

INVENTOR
ANTHONY J. FIORI
BY
Jerome Bauer
ATTORNEY.

United States Patent Office 3,030,874
Patented Apr. 24, 1962

3,030,874
METHOD OF MAKING BEVERAGES AND A CANISTER APPARATUS THEREFOR
Anthony J. Fiori, Sea Cliff, N.Y., assignor to REF Manufacturing Corporation, Mineola, N.Y.
Filed Aug. 7, 1959, Ser. No. 832,222
7 Claims. (Cl. 99—287)

This invention relates to a method of making beverages and a canister apparatus therefor.

The present invention is especially useful with fluid dispensing devices of the type disclosed in copending application Serial No. 736,771, filed May 21, 1958. Such fluid dispensing devices are intended to utilize the mechanism of a canister in which a beverage producing ingredient is adapted to be contained. The fluid dispensed by such devices is introduced into the canister apparatus to leach through the beverage producing ingredients for infusion therewith. The beverage infused fluid is then generally exhausted through an outlet of the canister apparatus directly into drinking cups or into a pitcher from which the same may be poured into individual drinking cups.

Under certain conditions, the beverage producing ingredient may be contained loosely in the canister apparatus for leaching and percolating by the fluid which then subsequently becomes infused therewith and results in the desired beverage. The present invention relates to a canister apparatus that utilizes a desired beverage producing ingredient packed in a filter container or bag. The bag is adapted to be mounted in the canister apparatus to permit its efficient use with the least possible effort.

Accordingly, it is the desideratum of this invention to provide a method and canister apparatus for making a desired beverage by introducing a fluid under pressure into the beverage producing ingredient such that the fluid will be caused to thoroughly leach the ingredient to insure its proper infusion thereby. To this end the invention contemplates certain unique and novel details of structure which comprise a drawer-like canister that is unusually simple to manipulate, having areas thereof well exposed for the inclusion and accommodation of a filter bag containing a beverage ingredient from which a desired beverage is produced when properly leached. Said drawer-like canister is so arranged as to permit manual arrangement of the beverage producing ingredient easily and efficiently therein and for removal therefrom without excessive manipulation upon the part of the operator.

Another object and feature of the invention resides in the provision of a canister apparatus that is provided with a canister drawer having a shape conforming substantially to that of a filter bag containing a desired beverage producing ingredient to enable such bag to be simply and properly located within the drawer and removed therefrom without special manual machinations or mechanical aptitudes.

Still another object and feature is the provision of a canister apparatus in which the beverage is placed under pressure to more evenly distribute the ingredients in the drawer to thereby result in a more complete leaching of the same and a proper infusion of the leaching fluid.

Still a further object of the invention is to provide a unique method and means for placing the ingredient under pressure and for properly sealing the walls of the drawer-like canister to eliminate residual dripping of fluid after completion of the beverage making operation, and to assure a more complete leaching and uniformly infused beverage fluid.

Figure 2:
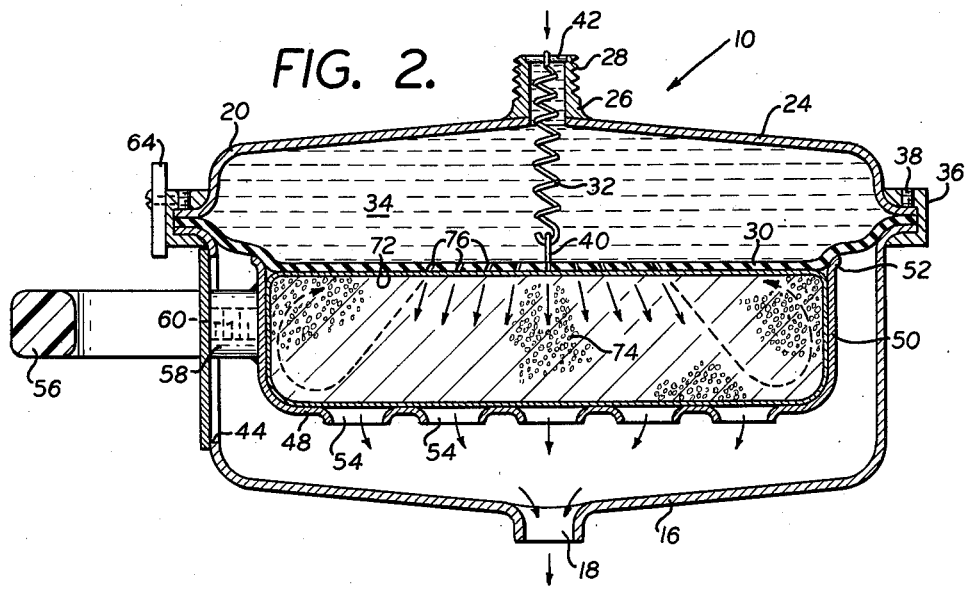
Figure 3:
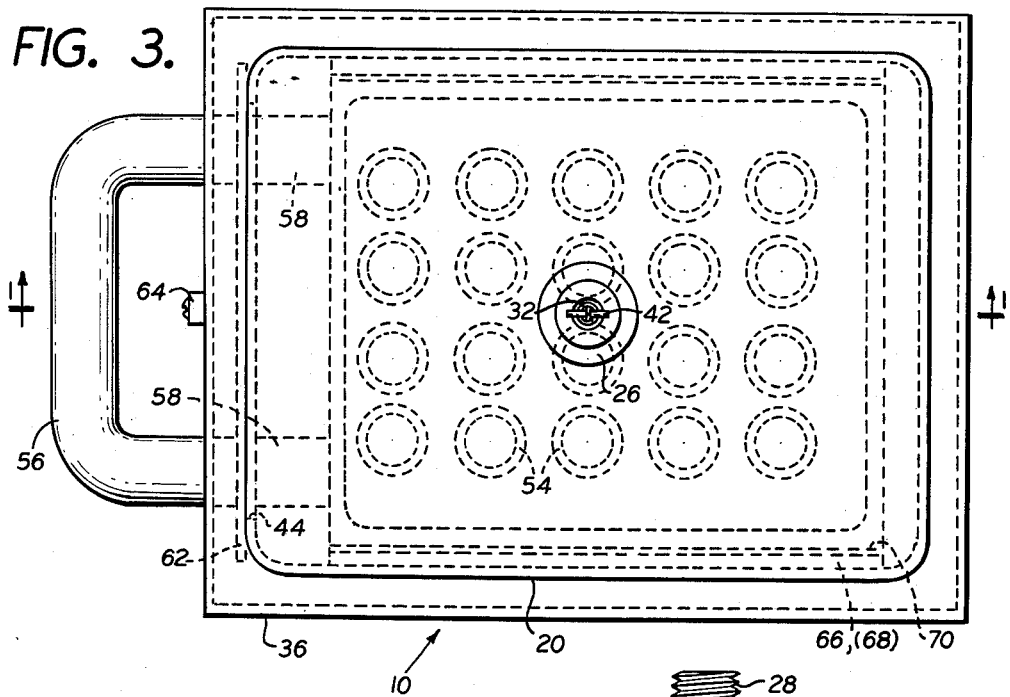
Figure 4:
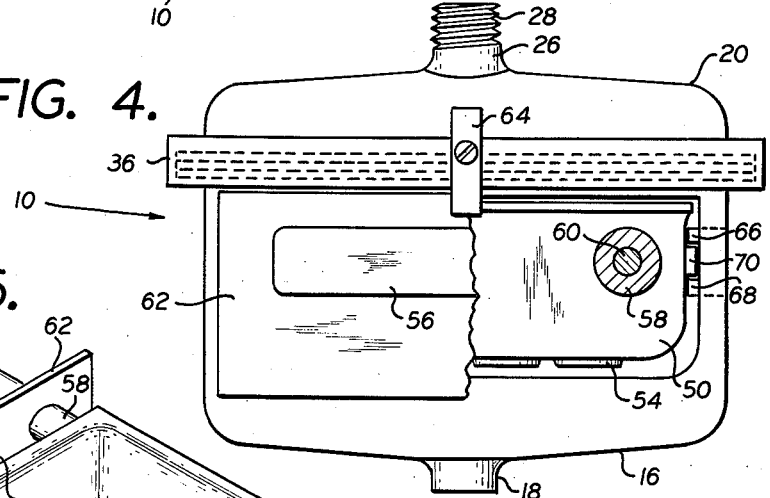
Figure 5:
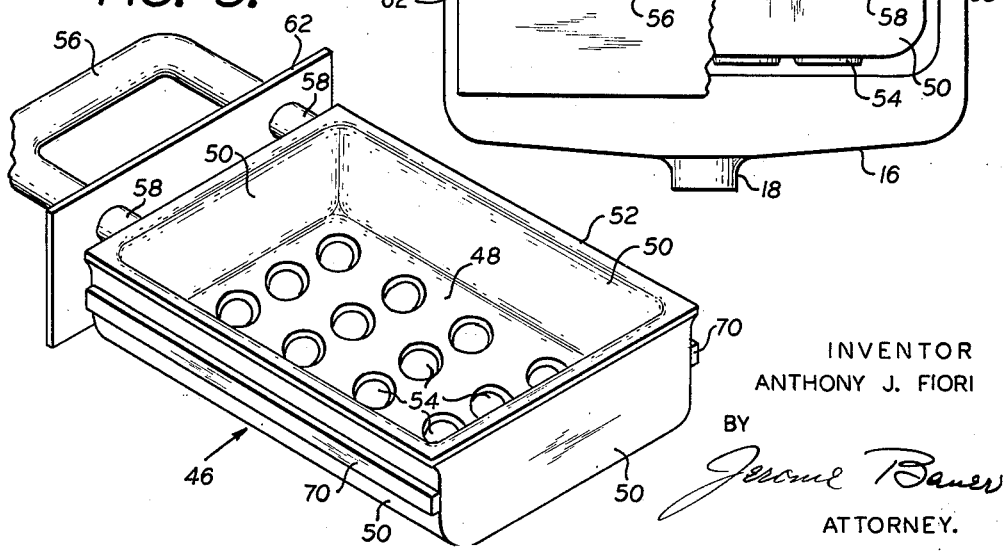

Other and further objects of my invention reside in the structures and arrangements hereinafter more fully described with reference to the accompanying drawings in which:

FIG. 1 is a sectional side view of the canister apparatus for making beverages as constructed in accordance with the teaching of the invention and as taken along lines 1—1 of FIG. 3 with parts thereof broken away, FIG. 2 is a view similar to FIG. 1 showing the parts thereof during the leaching or beverage making operation, FIG. 3 is a top view of the beverage making canister apparatus, FIG. 4 is a front view of FIG. 3 with a portion thereof broken away, and, FIG. 5 is a perspective view of the drawer-like canister.

Referring now to the drawings, the numeral 10 is employed to indicate in a general manner the overall canister apparatus. Such canister apparatus comprises a housing which is shown to be constructed in two basic parts, a lower part 12 and an upper part to be described.

The lower part 12 of the housing is rectangularly shaped having upwardly disposed walls terminating in a laterally directed uninterrupted marginal edge 14. Edge 14 extends completely about the periphery of the lower part 12 and is directed laterally outward. The bottom wall 16 of lower part 12 is provided with a slight downward taper or draft and terminates in a fluid outlet 18 from which beverage infused fluid is exhausted from the apparatus 10.

The upper part 20 of the housing coincides in overall size with that of the lower part 12. It too is provided with a laterally directed marginal edge 22 that is adapted to be positioned in overlying relationship with the marginal edge 14 of the lower part 12 of the housing. The upper wall 24 of the upper part 20 of the housing tapers slightly upward and terminates at its central portion in a fluid inlet 26 through which fluid is introduced into the apparatus 10. The inlet member 26 is depicted in the drawing as having a threaded outer surface 28. Although any other surface may be provided, in practical use the thread 28 enables the canister apparatus 10 to be secured as a unit to the aforementioned fluid dispensing device.

Fixedly mounted within the housing of the canister apparatus 10 and between the lower and upper parts 12 and 20 thereof is a diaphragm 30 that includes a yieldable force applying member in the form of a spring 32. The diaphragm 30 is interposed between the marginal edges 14 and 22 of the lower and upper parts of the housing respectively and is positioned between the housing fluid inlet 26 and outlet 18. In its relationship as shown in the drawings, it will be noted that the diaphragm is positioned adjacent to the inlet 26 and cooperates with the upper part 24 of the housing in such manner as to define a fluid inlet reservoir or space 34 therebetween.

Both the lower and upper parts 12 and 20 of the housing, and the diaphragm 30, are secured in their fixed relationship as described and as shown in the drawings with the marginal edge of the diaphragm 30 interposed between the marginal edges 14 and 22 by an encircling locking channel-shaped band 36. The band 36 is provided with a plurality of set screws 38 that may be threaded downwardly against the marginal edge 22 of the upper part 20 of the housing to positively lock the upper and lower parts 20 and 12 together with the diaphragm 30 secured therebetween. The spring member 32, forming part of the diaphragm structure, is connected to the diaphragm at its lower end at the eye 40 and at its upper end to a cross-pin 42 mounted in the housing.

The housing is substantially completely enclosed except for the fluid inlet 26 and outlet 18 and a drawer receiving opening 44 defined in one of the walls thereof. The opening 44 is provided to permit the simple manual sliding movement of a drawer-like canister, generally identified by the numeral 46, within the housing. Canister drawer 46 is more clearly shown in perspective in FIG. 5 of the drawings. It comprises a body having a base 48 from which a plurality of uninterrupted interconnected upstanding walls 50 extend. The upstanding walls 50 flare upward and outwardly to define a slight arc resulting in a continuous marginal edge 52, a cross section of which is depicted in FIGS. 1 and 2. The base 48 is provided with a plurality of exhaust openings 54 through which beverage infused fluid may pass and be discharged to outlet 18.

To enable simple manual movements of the body of the canister drawer 46, the same is provided with a handle structure comprising a handle member 56. The handle member 56 may be made of plastic or of other material that will not readily transmit heat. To further lessen the transmission of heat from the canister drawer to the handle 56, there is provided an insulating spacer 58 interposed between the wall 50 of the drawer and each end of the handle 56 proper. Both the handle, and the spacers 58 at the ends thereof, are secured in any convenient manner to the wall 50 of the drawer.

In FIGS. 1 and 2 of the drawings, it will be noted that a threaded member, as a screw or bolt 60 is employed; however, any other suitable means may be equally adaptable. Interposed and mounted between the spacer 58 and the legs of the handle 56 is a cover plate 62. Cover plate 62 is of such extent in length and height as to completely cover the housing opening 44 when the body of the canister drawer is inserted into the housing.

As depicted in FIGS. 1 and 2, the cover plate 62 is adapted to engage along the defining wall portions of the housing opening 44 and when so engaged therewith serves as a stop or limit against further inward insertion of the body of the canister drawer 46 into the housing. In practice a simple finger operated lock 64 may be secured on the encircling band 36 to normally extend downward into the path of the cover plate 62 as to prevent the accidental displacement of the drawer 46 from within the housing.

In order to enable the simple manual insertion and removal of the canister drawer 46 from the housing, there is provided a guiding structure on both the housing and drawer body. Referring to FIG. 4, the housing is provided with a pair of longitudinally extending vertically spaced guide members 66 and 68 positioned along its longer pair of oppositely disposed longer walls. The canister drawer 46 is provided with a longitudinally extending guide member 70 on its longer opposed side walls for guiding coaction with and between the vertically disposed guide means 66 and 68 of the housing.

In operation, a bag or container 72 of fine mesh or filter paper containing a desired beverage producing ingredient 74, as coffee grounds, is accommodated in the body of the canister drawer 46 as shown in FIG. 1. Such filter bag 72 is generally rectangularly shaped and therefore the interior drawer-like configuration of the body of the canister drawer 46 is substantially conformingly shaped to receive and accommodate the same therein. Initially the finger operated lock 64 is pivoted by the operator while he grasps the handle 56 of the canister drawer. The lock 64 is pivoted fully out of the path of the cover plate 62 to enable the canister drawer 46 to be removed from the housing without obstruction.

Once the lock 64 is moved out of obstructing position, it is a simple matter to manually slide the canister drawer 46 outward from between the guideways 66 and 68 of the housing. By simply pulling lightly on the handle 56, the operator can remove the whole canister drawer so that its interior is completely exposed. If a filter bag 72 containing beverage producing ingredients 74 is already positioned therein from a prior operation of the canister apparatus 10, the same may be removed simply by inverting the drawer. Although slight moisture will have a tendency to cause the filter bag to adhere to the interior of the drawer, a slight tapping of the marginal edges 52 on any surface while the drawer body is inverted will immediately dislodge the bag and cause it to fall by gravity into any refuse container.

Once the canister body is empty, a new filter bag 72 containing the desired beverage producing ingredient 74 may be positioned therein. Because such filter bag and the body of the canister drawer are of substantially the same shape, the bag is simply dropped into place within the drawer. This is ordinarily sufficient to place the drawer in condition for a new operation in the canister apparatus 10; however, under certain circumstances, numerous operators have been found to smooth out the top of the bag once it is placed in the drawer to more evenly distribute the beverage producing ingredients 74 contained therewithin.

The drawer body is then inserted into the housing at its opening 44 and thereafter the longitudinal guide members 70 on the opposite sides of the drawer are aligned between the vertically spaced housing guide members 66 and 68. The drawer is then simply manually pushed into place within the housing with slight or almost no perceptible force until such time as its cover plate 62 abuts the outer surface of the defining wall about the opening 44. Although the lock 64 may then be dropped into position to prevent accidental displacement of the canister drawer 46 from the housing as the description proceeds it will be recognized that such accidental displacement is not possible during the actual operation of the canister apparatus 10.

With the canister drawer 46 properly positioned within the housing of the apparatus 10, leaching fluid may now be introduced into the reservoir 34 by way of the inlet 26. The diaphragm 30 is provided with a plurality of located exhaust or discharge openings 76 that are predeterminately arranged to permit the inlet fluid to be discharged from the space or reservoir chamber 34 directly into the beverage producing ingredient 74. The discharge openings 76 are very minute in size and result in a very fine dispersion or spray of the inlet fluid into and for leaching of the ingredient 74. Further because of their size, the openings 76 are incapable of dispersing fluid from the chamber 34 at the same rate that the fluid is caused to enter the same from the inlet 26; therefore, the inlet fluid accumulates in the chamber and applies a pressure or force to the upper surface of the diaphragm 30.

The diaphragm 30 may be composed of rubber or other resilient yieldable material that will flex and bend to expand under the pressure of the inlet fluid. The fluid pressure is sufficient, therefore, to move the diaphragm 30 from its normal contracted condition as shown in FIG. 1, into its operative position and condition as shown in FIG. 2 wherein, the same has been moved down into conforming sealing engagement with the full periphery of the marginal edges 52 of the uninterrupted upstanding walls of the body of the canister drawer 46. This engagement is shown in FIG. 2 and results in a form-fitting, fluid-tight seal between the imperforate portion of the diaphragm and the walls of the canister body.

In consequence, fluid discharged under pressure from the reservoir 34 through the openings 76 of the diaphragm into the body of the canister drawer will be prevented from seeping outward about the walls of the canister drawer and will be positively directed for leaching of the ingredient 74. Further, such sealing engagement that occurs between the diaphragm and the walls of the canister drawer is of sufficient force as to actually prevent the accidental displacement of the drawer from the housing and, therefore, during the operation of the canister apparatus the finger lock 64 is found to be unnecessary.

The fluid pressure acting upon the upper surface of the diaphragm 30 also conformingly shapes the yieldable diaphragm into pressure or force applying engagement with almost all or with a substantial portion of the filter bag 72 as is shown in FIG. 2. The diaphragm applies a uniform intensity of pressure to the adjacent surface of the filter bag 72 and the ingredient 74 therein. This results in a more uniform distribution and packing of the particles of beverage producing ingredient 74 within the container body and eliminates air pockets and irregularities of the surfaces of the bag even if the same was not previously smoothed by the operator when the bag was initially placed in the canister drawer. Accordingly, each subsequent operation of the apparatus will provide substantially the same uniform distribution of the ingredients as in the preceding operation. Hence, each operation of the apparatus will be substantially constant and will produce substantially the same results as in the last operation. It will be noted that the return spring 32 will yield to permit the expansion or stretching and complete flexing of the diaphragm under the pressure of the inlet fluid that is generally introduced in the form of hot water.

The full heat of such fluid, however, is not transmitted to the handle 56 of the canister drawer because of the insulation qualities of the spacers 58, while the cover 62 prevents splashing of the beverage outside of the confining walls of the housing and, therefore, only permits the fluid to exhaust from the apparatus by way of the outlet 18 after the fluid completely leaches and becomes infused with the beverage producing ingredient. The exhaust openings 54 permit the discharge of the leaching, beverage infused fluid from the body of the canister drawer to the drainage draft of the bottom wall 16 of the housing which subsequently directs the fluid to the outlet 18.

After the ingredients 74 have been thoroughly leached the introduction of inlet fluid may be stopped and accordingly the pressure exerted by such fluid ceases. Upon the removal of such pressure, the normal resiliency of the diaphragm 30 tends to move the same back to its normal position as shown in FIG. 1. This movement is aided by the application of the force exerted by spring 32. After each operation, there normally remains some fluid in the reservoir 34; however, residual dripping of fluid from this reservoir through the discharge openings 76 of the diaphragm is prevented because the normal size of the openings 76 is such that the surface tension exerted between the fluid and the walls of the openings is sufficiently great as to prevent the fluid from dropping therethrough.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a canister apparatus for making beverages, a housing having a fluid inlet and outlet, an opening defined in said housing along a surface thereof, a yieldable diaphragm in said housing intermediate said fluid inlet and outlet, and a canister drawer in said housing engageable by said diaphragm and adapted to contain a beverage producing ingredient therein, means on said canister drawer to remove the same from beneath said diaphragm in said housing through said opening, said diaphragm yielding in response to fluid pressure at said inlet to engage said canister drawer.

2. In a canister apparatus, a housing having a fluid inlet and outlet, a canister drawer in said housing between said fluid inlet and outlet, yieldable sealing means in said housing between said fluid inlet and drawer, said sealing means yielding in response to the pressure of the fluid at said inlet to fluid-tightly seal said drawer about the periphery thereof, and a plurality of openings in said sealing means through which said inlet fluid may discharge into said drawer.

3. In a canister apparatus having a fluid inlet and outlet, a canister drawer adapted to contain a beverage producing ingredient to be leached by the inlet fluid and for infusion with said ingredient, said drawer having at least an opening defined therein for the discharge of the beverage infused fluid therefrom to said outlet, and means yieldable in said apparatus between said fluid inlet and drawer in response to the pressure of said inlet fluid to apply a pressure to said beverage producing ingredient in said drawer and to fluid-tightly engage and seal the walls of said drawer, said means having a plurality of fluid discharge openings to permit the discharge of said inlet fluid into said drawer for leaching of said ingredient and for infusion herewith.

4. In a canister apparatus, a housing having a fluid inlet and outlet, a drawer manually slidable into and out of said housing and adapted to contain a beverage producing ingredient to be leached by fluid discharging thereinto from said fluid inlet and the leaching fluid to be exhausted therefrom through said outlet, and means in said housing movable under the pressure of said inlet fluid to fluid-tightly engage and seal the walls of said drawer, said means having openings defined therein through which said inlet fluid discharged into said drawer, and yieldable means between said housing and movable means to move said movable means from engagement with the walls of said drawer when the discharge of the inlet fluid into the housing stops.

5. In a canister apparatus for making a desired beverage from a beverage producing ingredient, a substantially enclosed housing having fluid inlet and outlet means, a canister drawer adapted to contain the beverage producing ingredient therein, means on said drawer and housing to guide said drawer for removal from and insertion into said housing, handle means on said drawer to enable the manual movement thereof, and means in said housing operable in response to the pressure of inlet fluid at said fluid inlet to move into fluid-tight sealing engagement with said drawer and to apply a force to the beverage producing ingredient in said drawer, means to move said operable means out of sealing engagement with said drawer when the pressure of said inlet fluid stops, and openings defined in said operable means to permit the dispersed discharge of inlet fluid into said drawer for leaching of the ingredient therein and for infusion therewith.

6. A canister apparatus for making beverages comprising a substantially enclosed housing having an inlet for the introduction of fluid thereinto and an outlet for the exhaust of fluid therefrom, a diaphragm in said housing between said fluid inlet and outlet, fluid discharge means in said diaphragm, a member in said housing containing a beverage producing ingredient therein and including means for manually moving said member into and out of said housing beneath said diaphragm, said diaphragm being mounted in said housing for movement into fluid-tight sealing engagement with said member and to apply a packing force to the ingredient therein in response to the pressure of the fluid introduced into said housing at said inlet, said discharge openings in said diaphragm introducing said inlet fluid into said sealed member and the ingredient packed therein.

7. A canister apparatus for making beverages from a beverage producing ingredient comprising a housing having a fluid inlet and outlet, a drawer-like member containing a beverage producing ingredient therein and having a handle thereon for manual movement of said member into and out of said housing, a diaphragm in said housing position between said member and said fluid inlet and defining a fluid pressure reservoir with said housing, said diaphragm having fluid discharge openings defined therein whereby fluid introduced into said housing at said inlet is caused to enter said reservoir and apply a pressure on said diaphragm to move the same into fluid-tight sealing engagement with the walls of said member and whereby the fluid is discharged through said openings into said member for leaching said ingredient and infusion therewith, said diaphragm sealingly engaging the walls of said member to prevent the removal thereof from said housing during the fluid introduction into said housing, and discharge openings defined in said member to discharge the beverage infused fluid therefrom to said outlet, said diaphragm including means to move the same out of sealing engagement with said member when fluid is no longer introduced into said housing.

References Cited in the file of this patent

UNITED STATES PATENTS

| | | |
|---|---|---|
| 184,024 | Stewart | Nov. 7, 1876 |
| 1,222,451 | Ohnstrand | Apr. 10, 1917 |
| 2,227,892 | Soldan | Jan. 7, 1941 |
| 2,306,802 | Harbison | Dec. 29, 1942 |
| 2,620,088 | Tellander | Dec. 2, 1952 |
| 2,667,898 | Eichman | Feb. 2, 1954 |
| 2,715,868 | Brown | Aug. 23, 1955 |
| 2,763,526 | Falek | Sept. 18, 1956 |

FOREIGN PATENTS

| | | |
|---|---|---|
| 516,141 | Italy | Feb. 19, 1955 |
| 1,146,199 | France | May 20, 1957 |